United States Patent [19]
Carr et al.

[11] Patent Number: 5,617,273
[45] Date of Patent: Apr. 1, 1997

[54] THIN FILM SLIDER WITH PROTRUDING R/W ELEMENT FORMED BY CHEMICAL-MECHANICAL POLISHING

[75] Inventors: Jeffrey W. Carr, Morgan Hill; Jeffrey P. Gunder, San Jose, both of Calif.

[73] Assignee: International Business Machines Corporation, Armonk, N.Y.

[21] Appl. No.: 481,574

[22] Filed: Jun. 7, 1995

[51] Int. Cl.$^6$ ............... G11B 5/127; G11B 5/33; G11B 5/60; G11B 17/32
[52] U.S. Cl. ............................ 360/105; 360/113
[58] Field of Search .................. 360/103, 104, 360/105; 369/113, 43, 605; 338/32 R; 324/252

[56] References Cited

U.S. PATENT DOCUMENTS

| | | | |
|---|---|---|---|
| 4,115,827 | 9/1978 | Gooch | 360/121 |
| 4,545,014 | 6/1984 | Bischoff | 204/129 |
| 4,636,897 | 6/1987 | Nakamura et al. | 360/119 |
| 4,673,999 | 6/1987 | Suyama et al. | 360/125 |
| 4,855,854 | 8/1989 | Wada et al. | 360/126 |
| 5,156,704 | 10/1992 | Kemp | 360/103 |
| 5,271,802 | 12/1993 | Chang et al. | 29/603 |
| 5,272,582 | 12/1993 | Shibata et al. | 360/113 |
| 5,283,942 | 2/1994 | Chen et al. | 29/602 |
| 5,331,495 | 7/1994 | Yoshida et al. | 360/126 |
| 5,337,203 | 8/1994 | Kitada et al. | 360/113 |
| 5,351,229 | 9/1994 | Brezoczky et al. | 369/113 |
| 5,473,492 | 12/1995 | Terunuma et al. | 360/113 |

*Primary Examiner*—Robert S. Tupper
*Assistant Examiner*—Adriana Giordana
*Attorney, Agent, or Firm*—Baker, Maxham, Jester & Meador

[57] ABSTRACT

A composite thin film slider with a protruding R/W device formed by chemical-mechanical polishing to protrude above its substrate and thereby reduce the distance between the R/W device and the recording media. The slider includes a ceramic or non-ceramic substrate with a substantially planar bearing surface, and a R/W device. The R/W device includes an insulator and certain conductive R/W components, deposited onto the substrate's deposit end. The R/W components may include, for example, a magnetic shield layer, a MR stripe layer, and a magnetic pole tip layer, all layered over the deposit end of the substrate. The R/W components protrude from the insulator sufficiently to extend past the substrate's bearing surface. To manufacture this slider, a substrate with the R/W device deposited thereon is polished with a lapping slurry to disproportionately erode the substrate and insulator with respect to the R/W components. The R/W components therefore protrude from the insulator and the ceramic substrate's bearing surface.

12 Claims, 4 Drawing Sheets ized layer such as alumina or a suitable oxide material. Each R/W device additionally includes conductive components such as multiple shields, an MR stripe, and a pole tip.

THIN FILM SLIDER WITH PROTRUDING R/W ELEMENT FORMED BY CHEMICAL-MECHANICAL POLISHING

BACKGROUND OF THE INVENTION

1. Field of the Invention

The present invention relates to thin film sliders for use with magnetic data storage media such as disk and tape media. More particularly, the invention concerns a composite thin film slider with a protruding read/write ("R/W") device formed by chemical-mechanical polishing to protrude above its substrate and thereby reduce the magnetic spacing between the R/W device and the recording media.

2. Description of the Related Art

One of the most important parts of a tape or disk drive is its recording head, also called a "slider." The slider is one factor in determining the efficiency, density, speed, and accuracy with which data can be read from and written to magnetic recording media. As engineers are increasing the performance requirements of their recording systems, they are concurrently researching improved designs for sliders. One of the chief goals in designing a slider is minimizing the distance between the recording medium and the region of the slider that actually performs read and write operations, i.e. the R/W "device." This distance may be referred to as the "magnetic spacing." With a smaller magnetic spacing, the R/W device can store data more compactly on the recording medium, thereby increasing the recording medium's storage capacity.

One of the chief obstacles to reducing magnetic spacing is the difference in elevation between the slider's substrate and its R/W device. As discussed below, known techniques for lapping and polishing typically produce sliders with R/W devices that are eroded below the level of the adjacent substrate. This increases the magnetic spacing.

Sliders are typically derived from a wafer 100 (FIG. 1) composed of a substrate of "N58" (a titanium carbide (TiC) and aluminum oxide ($Al_2O_3$) mix) and an overcoat comprising read/write device metallurgy and an insulator such as $Al_2O_3$. Depending upon the size of the wafer 100 and the sliders to be cut, the wafer 100 may produce from 500 to 10,000 individual sliders. The components of each slider's R/W device are deposited onto a surface 102 of the wafer's substrate. These components include, for example, pole tips, magnetoresistive ("MR") elements, shields, and the like. These components are usually made from aluminum oxide, metals, or another material different than the substrate.

The next step in preparing an individual slider is to cut the wafer 100 into rows, such as the row 200 (FIG. 2). The row 200 has a "deposit end" 102 (corresponding to the surface 102 of FIG. 1) and a bearing surface 202. The row 200 may have dimensions of about 47 mm×2 mm×0.5 mm, for example. Next, the bearing surface 202 is smoothed by conventional lapping and polishing techniques to provide sliders with precise dimensions. After air bearing fabrication, the row 200 is then cut into individual sliders, such as the slider 300 (FIG. 3). The slider 300 includes a substrate 302 and a comparatively small R/W device, which is not shown but occupies an area 304 of the deposit end 102. The R/W device 304 is deposited along the deposit end 102 of the substrate 302. Prior to cutting the row 200 into individual sliders, the deposit end 102 of the individual slider 300 (FIG. 3) constituted part of the surface 102 of the row 200 (FIG. 2).

FIG. 4 illustrates the substrate 302 and the R/W device 304 in greater detail. The R/W device 304 includes an insulator 408, multiple shields 400–401, an MR stripe 402, and a pole tip 404. The slider 300 may also include a nearly uniform carbon overlayer 406 covering the substrate 302 and R/W device 304, to protect the slider 300 from wear, contamination, or damage.

For many applications, the slider 300 of FIGS. 3–4 satisfies its users' expectations. However, for applications requiring a higher recording density, known sliders may not be completely adequate. As shown in FIG. 4, known slider manufacturing processes yield a R/W device 304 that is recessed in elevation with respect to the bearing surface 202 of the substrate 302, usually by about 15–20 nm. Additionally, the shields 400–401, MR stripe 402, and pole tip 404 are recessed with respect to the insulator 408. Accordingly, when the slider 300 is implemented in a magnetic recording device, the critical components of the R/W device 304 may be excessively distanced from the recording medium (not shown), thereby reducing the slider's recording density.

SUMMARY OF THE INVENTION

The present invention concerns a composite thin film slider with a protruding R/W device formed by chemical-mechanical polishing to protrude above its substrate and thereby reduce the distance between the R/W device and the recording media.

The slider of the invention includes a substrate and a R/W device, where the R/W device further includes an insulator and various conductive R/W components. These components may include, for example, multiple shields, an MR stripe, and a pole tip. The slider may also include a nearly uniform overlayer 606 (such as a carbon-based layer) covering the substrate and R/W device to protect the slider from wear, contamination, and damage.

As a result of the process for manufacturing the slider, the substrate defines a smooth, nearly planar bearing surface. However, due to the relative hardnesses of the substrate and the insulator, the surface of the insulator and R/W device may be recessed somewhat with respect to the bearing surface. Unlike known sliders, components of this R/W device protrude from the insulator, and furthermore rise above the extended plane of the substrate's bearing surface. If desired, the overlayer may be thinned or removed proximate the R/W device. This permits the R/W device, which still protrudes above the extended plane of the substrate's bearing surface, to ultimately reside nearer to the recording medium during operation of the slider.

A different aspect of the invention comprises a method for manufacturing a slider such as that described above, employing chemical-mechanical polishing to ensure that the components of the slider's R/W device protrude above the bearing surface of its substrate and thereby reduce the distance between the R/W device and the recording media. More particularly, a substrate is manufactured with a deposit end containing multiple embedded R/W devices. The material of the substrate may comprise a ceramic, such as TiC/$Al_2O_3$ ("N58"), silicon carbide, or zirconium oxide, or a non-ceramic such as silicon. Each R/W device on the wafer preferably includes a insulator, preferably formed from an insulating material such as alumina or a suitable oxide material. Each R/W device additionally includes conductive components such as multiple shields, an MR stripe, and a pole tip.

After creating the wafer and the R/W devices contained thereon, the wafer is cut into rows. Then, a bearing surface of each row is polished. The rows are then polished by mounting the rows to a lapping machine and chemically-mechanically polishing the rows' bearing surface with a polishing slurry. In a first embodiment, the rows may be polished by float polishing the rows in a slurry that has a partial chemical affinity for the substrate. In the float polishing embodiment, the slurry comprises (1) a solid component such as an oxide-based material such as silicon dioxide, aluminum oxide, cerium oxide, or diamond along with (2) a liquid vehicle such as water or glycol. Due to the chemical and mechanical relationship between the slurry, the substrate, the insulator and the R/W components, the slurry erodes the insulator and substrate disproportionately more than the conductive R/W components. In non-contact or float polishing, the solid component of the slurry (i.e., the abrasive) has a diameter less than the thickness of the liquid layer separating the lapping surface and the surface of the lap plate.

In a second embodiment, the wafer may be polished chemically-mechanically by contact polishing the wafer in a slurry that has a chemical-mechanical affinity for the substrate. In the contact polishing embodiment, the slurry may comprise a similar conbination as described above for use in float polishing. In the second embodiment, the slurry erodes the substrate and the insulator disproportionately more than the conductive R/W components due to (1) the mechanical abrasion of the slurry against the wafer, and (2) the chemical relationship between the slurry, the substrate, the insulator, and the conductive R/W components.

After contact or float polishing, the substrate and insulator regions of the rows preferably define smooth, nearly planar surfaces. Due to the relative harnesses of the substrate and the insulator, however, the substrate surface may be recessed somewhat with respect to the insulator surface. Unlike known sliders, though, the shields, MR stripe, and pole tip preferably protrude from the insulator surface, and furthermore rise above the extended plane of the substrate's bearing surface.

At this point, the rows' bearing surface may be processed to define an air bearing surface thereon. Also, a nearly uniform overlayer may be deposited over each substrate and R/W device, to protect the individual sliders from wear, contamination, and damage. If desired, the overlayer may be thinned or removed proximate the components of the R/W device, by further contact or float polishing to permit the components, still protruding above the extended plane of the bearing surface, to reside nearer to the recording medium during operation of the slider. Next, the rows are cut into individual sliders.

The invention affords its users with distinct advantages. For instance, the invention provides a thin film head with a R/W device that protrudes above its substrate, thereby decreasing the magnetic spacing between the slider and the recording medium. This improves the coupling between the two, resulting in increased storage density.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Slider Composition

Broadly, the present invention concerns a composite thin film head or "slider" with a R/W device that advantageously protrudes above its substrate, thereby reducing the distance between the R/W device and the recording media during operation of the slider.

Figure 1:
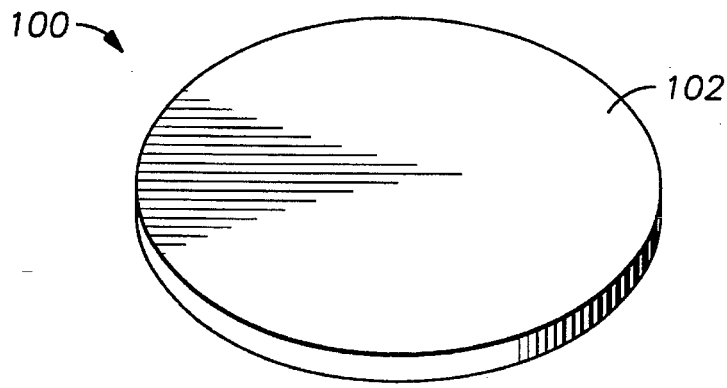
FIG. 1 is a perspective view of a known wafer 100.
Figure 2:
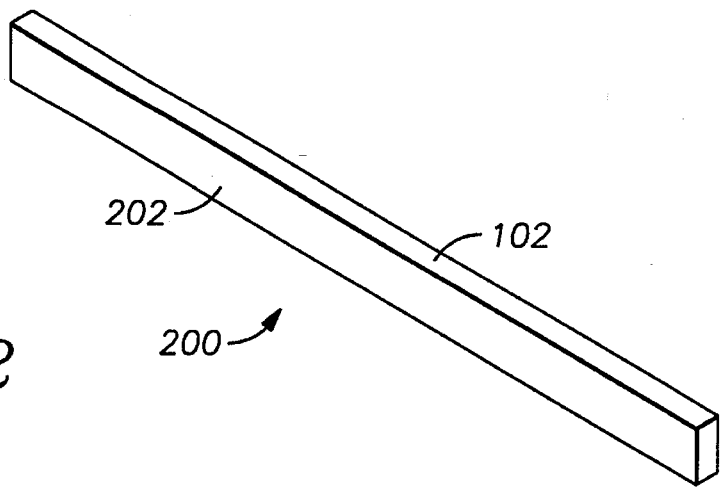
FIG. 2 is a perspective view of a known row 200 cut from a wafer 100.
Figure 3:
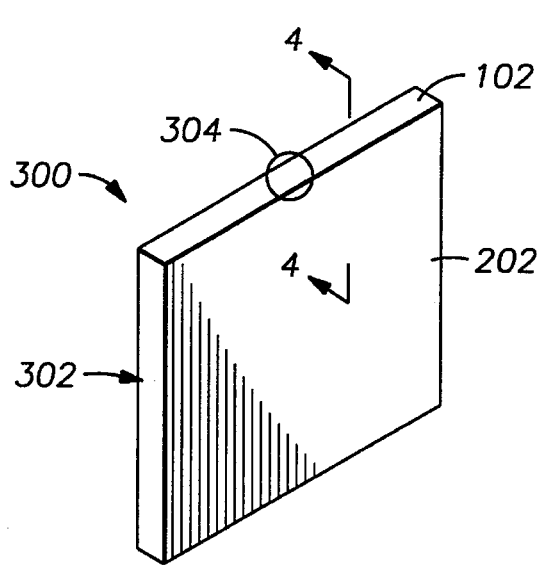
FIG. 3 is a perspective view of a known slider 300.
Figure 5:
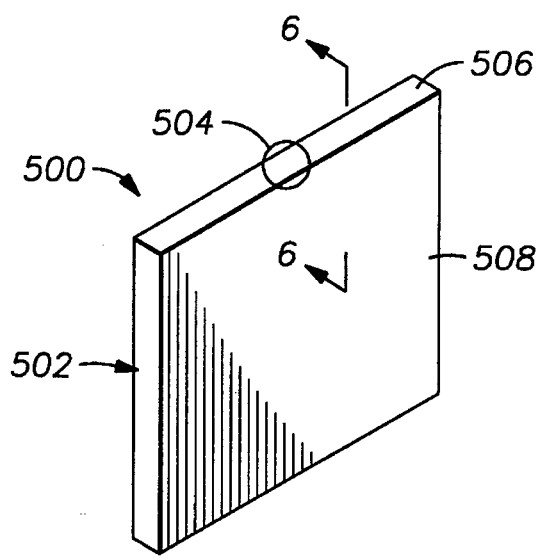
FIG. 5 is a perspective view of a slider 500 in accordance with the invention.
Figure 4:
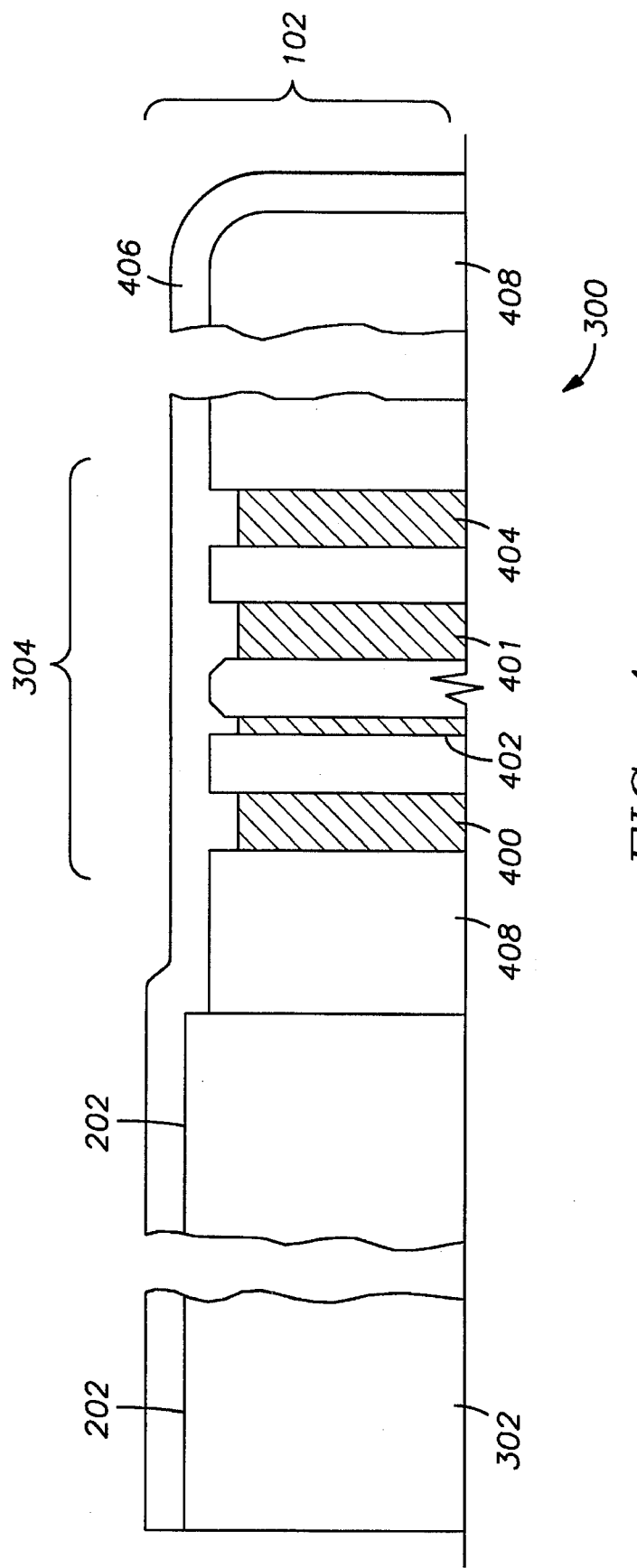
FIG. 4 is a partial cross-sectional view of the slider 300, taken along the line 4—4.

FIG. 5 depicts an example of a slider 500 that embodies the invention. The slider 500 generally comprises a thin rectangular substrate 502 with a relatively small R/W device 504 formed upon a deposit end 506 of the substrate 502. The end 506 generally corresponds to the deposit end 102 of a conventional slider 300. The substrate 502 may comprise a ceramic material, such as $TiC/Al_2O_3$ (called "N58"), silicon carbide, or zirconium oxide, or a non-ceramic material such as silicon. The slider 500 includes a bearing surface 508 that generally corresponds to the bearing surface 202 of a conventional slider 300.

Figure 6:
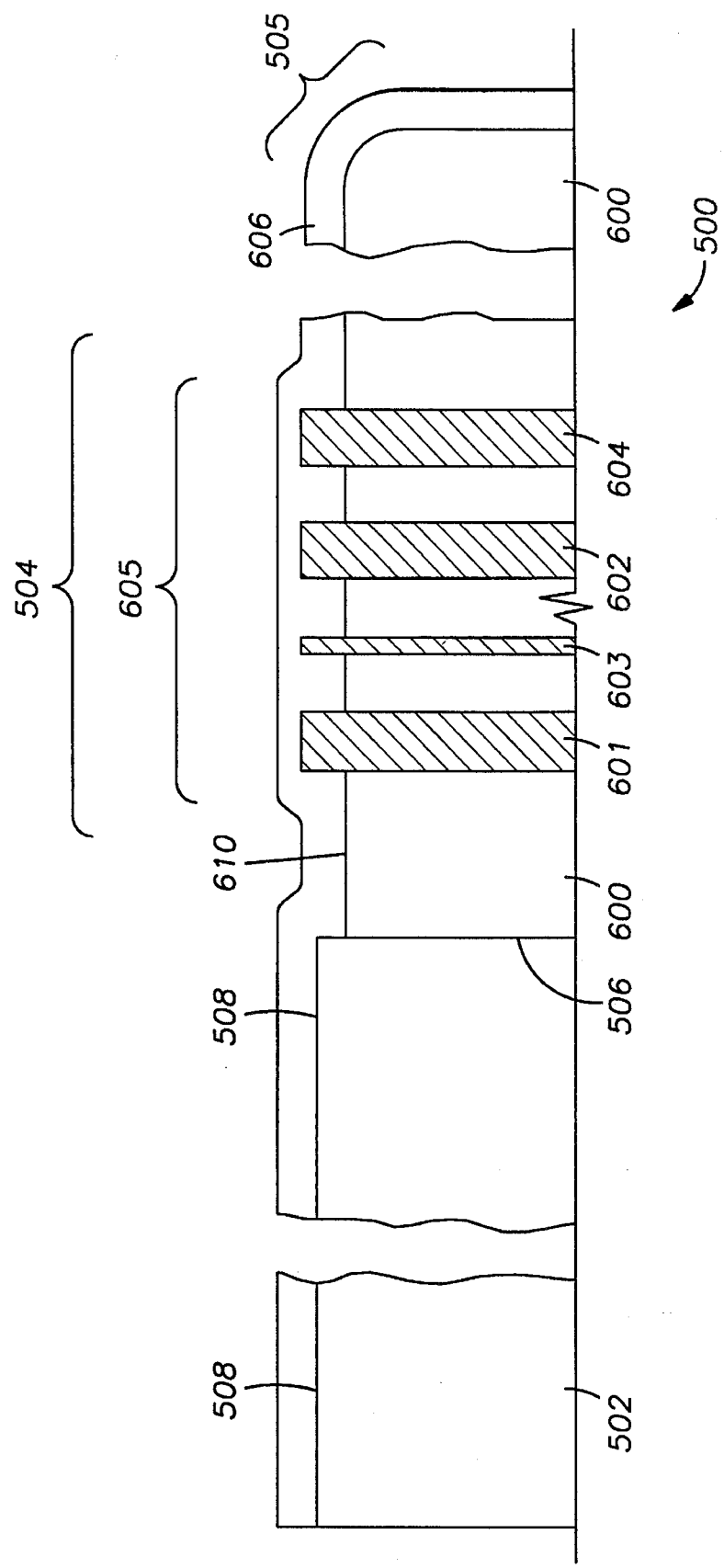
FIG. 6 is a partial cross-sectional view of the slider 500, taken across the line 6—6, in accordance with the invention.

FIG. 6 illustrates the R/W device 504 in greater detail. The R/W device 504 includes an insulator 600, preferably formed from an insulating material such as alumina. The insulator 600 is layered on top of the deposit end 506. The R/W device 504 includes various conductive R/W components 605, such as multiple shields 601–602, an MR stripe 603, and a pole tip 604. The R/W components 605 are preferably formed from a magnetic material such as an iron-nickel combination, or another known composition. The slider 500 may also include a nearly uniform overlayer 606 (such as a carbon-based layer) covering the substrate 502 and R/W device 504, to protect the slider 500 from wear, contamination, and damage.

As a result of the process for manufacturing the slider 500 (discussed below), the bearing surface 508 defines a smooth, nearly planar surface. Likewise, the insulator 600 may define a smooth, nearly planar surface 610. Due to the relative hardnesses of the substrate 502 and the insulator 600, however, the surface 610 may be recessed somewhat with respect to the bearing surface 508, on the order of 10–15 nm. Unlike known sliders, the R/W components 605 preferably protrude from the insulator's surface 610, and furthermore rise above the extended plane of the bearing surface 508. In one embodiment, the overlayer 606 may be thinned proximate the R/W components 605. This permits the R/W components 605, still protruding above the extended plane of the bearing surface 508, to reside still nearer to the recording media during operation of the slider 500.

CONSTRUCTION OF SLIDER

Figure 7:
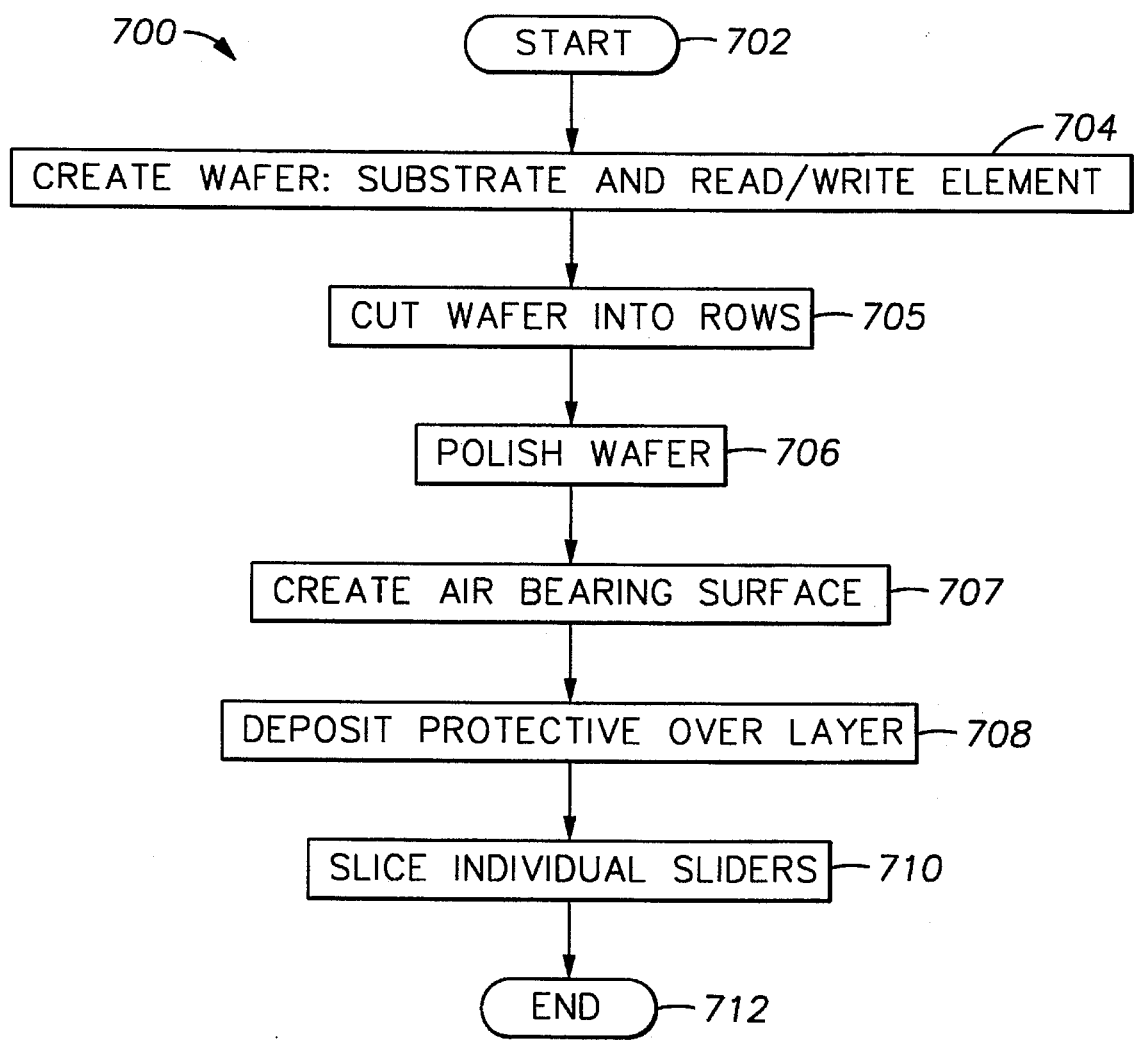
FIG. 7 is a flowchart illustrating an exemplary sequence of method steps pursuant to the invention.

In addition to the improved slider described above, the present invention contemplates a method for manufacturing such a slider, employing chemical-mechanical polishing to ensure that the R/W components of the slider protrude above their substrate, thereby reducing the distance between the R/W device and the recording media. More particularly, FIG. 7 shows an exemplary sequence of operational steps 700 in accordance with the invention. To illustrate the steps 700 more clearly, reference is also made to FIGS. 1–2 and 5–6.

After the routine 700 is initiated in task 702, a ceramic wafer 100 is manufactured in task 704 with a deposit end 102 containing multiple embedded R/W devices (not shown). Task 704 may be performed, for example, with conventional techniques for creating the wafer 100 and R/W devices. For example, task 704 may involve depositing a multiplicity of R/W devices onto the deposit end 102 of a 125 mm wafer 100 using known techniques.

As discussed above, the material of the wafer 100 comprises a ceramic, such as N58, silicon carbide, or zirconium oxide, or a non-ceramic such as silicon. Also as discussed above, each R/W device (such as the R/W device 504) is deposited on the end 102 (corresponding to the end 506 in the case of the slider 500), with the layers shown in FIG. 6. A R/W device 504, for example, preferably includes an insulator 600 and certain R/W components 605. The insulator 600 is, preferably formed from an insulating material such as alumina, or another oxide. The conductive R/W components 605 may include multiple shields 601–602, an MR stripe 603, and a pole tip 604, for example. To form a R/W device 504, layers of insulator and appropriate conductive material are alternately deposited on the end 102, in appropriate thicknesses to generate the layering shown by the R/W device 504 of FIG. 6.

After creating the wafer in task 704, the wafer is sliced into rows in task 705 and the bearing surface 202 (corresponding to the surface 508 in the case of the slider 500) is polished in task 706. Specifically, in task 706, the wafer is mounted to a lapping machine and mechanically or chemically-mechanically polished with a polishing slurry. In a first embodiment, the wafer may be polished by "float polishing" the wafer in a slurry that has a partial chemical affinity for most, if not all of, the materials in the slider 500. In the float polishing embodiment, the slurry comprises (1) a solid component such as an oxide-based material like silicon dioxide, aluminum oxide, cerium oxide or diamond, along with (2) a liquid vehicle such as water or glycol. In embodiments where the substrate 502 is made from "N58", a preferred slurry comprises a solution of 30–1000 Å silicon dioxide particles (2%) immersed in distilled water (98%). A preferred speed of rotation during float polishing is 50–68 RPM, with a non-linear rotary pattern. Float polishing may be conducted for about 5–60 minutes, for example.

During "float polishing", the surface 508 of the row 200 is separated from the lapping plate by hydrostatic repulsion. Mechanical polishing occurs only by contact between the surface 508 and particles of the polishing slurry rather than the lapping plate. Due to the chemical and mechanical relationship between the slurry, the substrate, the insulator, and the R/W components 605, the slurry erodes the insulator 600 and substrate 502 disproportionately more than the conductive R/W components 605. The components 605 of the R/W device 504 are therefore elevated above the extended plane of the bearing surface 508 of the substrate 502.

In a second embodiment, the wafer may be polished chemically-mechanically, by contact polishing the wafer in a slurry that has a chemical and mechanical affinity for the materials in the slider. In the contact polishing embodiment, the slurry may comprise a similar combination as described above for use in float polishing. Here, a preferred speed of rotation during float polishing is 50–58 RPM, with a non-linear rotary pattern and a lap pressure of approximately 100 g/cm$^2$. The lapping plate may comprise, for example, a tin-based material cut with a grooved float polishing pattern having a roughness of less than 2 microns on its flat areas. Alternatively, a standard tin lapping plate may be used. Contact polishing may be conducted for about 5–60 minutes.

During contact polishing, the bearing surface 508 of the row 200 contacts the lapping plate, which results in faster rates of abrasion. Abrasion may be accelerated by using a more abrasive lapping plate and/or by slowing the lapping plate's speed of rotation.

In the contact polishing embodiment, the slurry erodes the insulator and substrate disproportionately more than the conductive R/W components due to (1) the mechanical abrasion of the slurry against the bearing surface, and (2) the chemical relationship between the slurry, the substrate, the insulator, and the R/W components. This leaves the components of the R/W device 504 protruding with respect to the extended plane of the bearing surface 508 of the substrate 502.

After task 706, the substrate 502 preferably defines a smooth, nearly planar bearing surface 508. Likewise, the insulator 600 may define a smooth, nearly planar surface 610, interrupted only by the protruding R/W components 605. Due to the relative hardnesses of the substrate 502 and the insulator 600, however, the surface 610 may be recessed somewhat with respect to the surface 508. Unlike known sliders, the R/W components 605 preferably protrude from the surface 610, and even extend above the extended plane of the bearing surface 508. With the described method, the R/W components 605 may protrude between 10 nm and 150 nm above the insulator 600, for example.

After task 706, task 707 is performed to create an "air bearing" on the surface 508. Particularly, the surface 508 may be processed with a photoresist or otherwise etched to create grooves that facilitate movement of the slider 500 over the surface of a magnetic recording media.

After task 706, task 708 may be performed (optionally) to deposit a nearly uniform overlayer 606 to cover the substrate 502 and R/W device 504, to protect the slider 500 from wear, contamination, and damage. The overlayer 606 may comprise a carbon-based material having a thickness of about 10 nm, for example. If desired, further float or contact polishing may be preferred to thin or remove the overlayer 606 proximate the R/W components 605, so that the R/W components 605 may reside even closer to the recording media during operation of the slider 500.

After task 708, task 710 is performed, where each row 200 is sliced into individual sliders. In an exemplary embodiment, each slider may be about 2 mm long, 1.5 mm wide, with a thickness of about 800 μm. After task 710, the routine 700 ends in task 712.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

For example, different float or contact polishing parameters may be used, varying the time, speed rotation, pressure, particle size and type, and the like. Additionally, the invention contemplates R/W elements with a different number, structure, or arrangement of R/W components, in substitution for, or in addition to, the shields, MR stripe, and pole tips.

What is claimed is:

1. A slider for magnetically reading and writing digital data to and from a magnetic recording medium, said slider comprising:

a substrate including a bearing surface and an adjoining deposit end;

an insulator layered on top of the deposit end;

a read/write device, comprising:

a magnetic shield layer embedded in the insulator;

a magnetoresistive stripe layer embedded in the insulator; and a magnetic pole tip layer embedded in the insulator;

wherein the magnetic shield layer and the magnetoresistive stripe layer both protude from the bearing surface; and a protective overlayer deposited over the substrate, insulator and read/write device, said overlayer being reduced in thickness adjacent each protruding layer of the read/write device.

2. The slider of claim 1, wherein the insulator comprises alumina.

3. The slider of claim 1, wherein the insulator comprises an oxide-based material.

4. The slider of claim 1, wherein the substrate comprises TiC and $Al_2O_3$.

5. The slider of claim 1, wherein the substrate comprises silicon carbide.

6. The slider of claim 1, wherein the substrate comprises silicon.

7. The slider of claim 1, wherein the ceramic substrate comprises zirconium oxide.

8. The slider of claim 1, wherein the substrate comprises a ceramic material.

9. The slider of claim 1, wherein the read/write device further includes a second magnetic shield layer embedded in the insulator.

10. The slider of claim 9, wherein the second magnetic shield layer protrudes with respect to the bearing surface.

11. The slider of claim 1, wherein the protective overlayer comprises carbon.

12. A thin film head for exchanging signals with a magnetic recording medium, comprising:

a substrate including a substantially planar bearing surface and an adjoining deposit end; and a R/W device deposited on the deposit end, comprising:

an insulator deposited onto the deposit end;

multiple R/W components deposited onto the deposit end, said R/W components including a magnetoresistive stripe layer protruding from an extended plane of the bearing surface; and a protective overlayer deposited over the substrate, insulator, and read/write device, said overlayer being reduced in thickness adjacent the magnetoresistive stripe layer.

\* \* \* \* \*